(12) United States Patent
Bickers et al.

(10) Patent No.: US 10,302,115 B2
(45) Date of Patent: May 28, 2019

(54) SPRING CLIP UPRIGHT CONNECTION FOR RACK SHELVING

(71) Applicant: WHIRLPOOL CORPORATION, Benton Harbor, MI (US)

(72) Inventors: Brian S. Bickers, Stevensville, MI (US); Matthew E. Pennington, St. Joseph, MI (US); Zachary J. Saylor, St. Joseph, MI (US); Christina Schuette, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 51 days.

(21) Appl. No.: 15/296,389

(22) Filed: Oct. 18, 2016

(65) Prior Publication Data

US 2018/0106284 A1  Apr. 19, 2018

(51) Int. Cl.

| | |
|---|---|
| *F16B 12/38* | (2006.01) |
| *A47B 47/00* | (2006.01) |
| *A47B 47/02* | (2006.01) |
| *A47B 57/34* | (2006.01) |
| *A47B 96/06* | (2006.01) |
| *A47B 96/14* | (2006.01) |
| *F16B 2/24* | (2006.01) |
| *A47B 57/50* | (2006.01) |
| *F16B 7/00* | (2006.01) |

(52) U.S. Cl.
CPC ......... *F16B 12/38* (2013.01); *A47B 47/0083* (2013.01); *A47B 47/021* (2013.01); *A47B 57/34* (2013.01); *A47B 57/50* (2013.01); *A47B 96/06* (2013.01); *A47B 96/145* (2013.01); *A47B 96/1458* (2013.01); *F16B 2/241* (2013.01); *A47B 47/024* (2013.01); *A47B 47/027* (2013.01); *A47B 2230/07* (2013.01); *F16B 7/00* (2013.01)

(58) Field of Classification Search
CPC .......... F16B 12/38; F16B 2/241; A47B 57/34
USPC ........ 211/187, 192; 403/189, 326, 327, 329, 403/330
See application file for complete search history.

(56) References Cited

U.S. PATENT DOCUMENTS

| | | | |
|---|---|---|---|
| 1,411,260 A | 4/1922 | Baker | |
| 1,572,003 A | * 2/1926 | Rives | ...... F24C 15/08 108/156 |
| 3,154,833 A | 11/1964 | Kimball | |

(Continued)

FOREIGN PATENT DOCUMENTS

| | | |
|---|---|---|
| DE | 29512920 | 10/1995 |
| DE | 10 2006 001516 | 7/2007 |

(Continued)

*Primary Examiner* — Stanton L Krycinski
(74) *Attorney, Agent, or Firm* — Price Heneveld LLP

(57) ABSTRACT

A spring clip upright connection for rack shelving includes one upright with tabs and square cutouts and another upright with slots with metal spring clips. As the tabs of one upright are inserted into the slots of the other upright, the uprights are aligned and the spring metal clips open up. When the tabs are fully inserted, the clips latch into the cutouts of the slots of the other upright thereby engaging the upright sections together. This latching prevents one upright from being removed from the other upright while the slots and tabs maintain the appropriate alignment of the uprights.

12 Claims, 4 Drawing Sheets

(56) References Cited

U.S. PATENT DOCUMENTS

| | | | |
|---|---|---|---|
| 3,221,466 A * | 12/1965 | Downing, Jr. | E04B 9/10 403/219 |
| 3,297,345 A * | 1/1967 | Downing, Jr. | E04B 9/10 403/326 |
| 3,318,462 A | 5/1967 | Spiegl et al. | |
| 3,480,155 A | 11/1969 | Ferdinand et al. | |
| 3,565,474 A * | 2/1971 | Stumbo et al. | E04B 9/10 403/219 |
| 3,603,628 A * | 9/1971 | Smith | E04B 1/5831 403/172 |
| 3,797,671 A | 3/1974 | Sebilleau et al. | |
| 3,898,784 A * | 8/1975 | Sauer | E04B 9/10 403/327 |
| 4,391,545 A * | 7/1983 | Zummer | F16B 7/0446 403/189 |
| 4,415,292 A * | 11/1983 | Alperson | F16B 7/0446 292/352 |
| 4,431,331 A * | 2/1984 | Brody | F16B 7/0446 403/189 |
| 4,643,610 A * | 2/1987 | Bien | F16B 37/043 403/326 |
| 4,801,026 A | 1/1989 | Andersson | |
| 5,127,762 A | 7/1992 | Havlovitz | |
| 5,144,780 A | 9/1992 | Gieling et al. | |
| 5,400,870 A | 3/1995 | Inoue | |
| 5,531,464 A | 7/1996 | Maurer et al. | |
| 5,553,549 A * | 9/1996 | Nilsson | A47B 9/00 100/144 |
| 5,947,628 A * | 9/1999 | Hansen | A47B 87/002 108/64 |
| 6,241,109 B1 | 6/2001 | Kautz et al. | |
| 6,443,320 B1 | 9/2002 | Herzog et al. | |
| 6,604,640 B1 | 8/2003 | Jehin | |
| 6,676,326 B2 | 1/2004 | Wu | |
| 6,729,100 B2 * | 5/2004 | Koski | E04B 9/068 403/346 |
| 7,066,676 B2 | 6/2006 | Tsai | |
| 7,703,258 B2 * | 4/2010 | LaLonde | E04B 9/10 403/300 |
| 7,857,152 B2 | 12/2010 | Smith | |
| 2012/0304443 A1 | 12/2012 | Quail | |
| 2013/0017013 A1 * | 1/2013 | Hale | A47C 4/02 403/327 |

FOREIGN PATENT DOCUMENTS

| | | |
|---|---|---|
| EP | 0808589 | 11/1997 |
| EP | 1415694 | 5/2004 |
| EP | 1854375 | 11/2004 |
| FR | 2274818 | 1/1976 |
| FR | 2773688 | 7/1999 |
| GB | 2 202 296 | 9/1988 |
| GB | 2444820 | 6/2008 |
| WO | 0077408 | 12/2000 |
| WO | 2013152491 | 10/2013 |

* cited by examiner

SPRING CLIP UPRIGHT CONNECTION FOR RACK SHELVING

BACKGROUND

The present device generally relates to a spring clip upright connection for use in a shelving system. In particular, the spring clip upright connector includes an upright with one or more tabs having a cutout that connects with another upright having one or more slots with a spring clip. When the tab is inserted into the associated slot, the uprights are aligned and the spring clip latches into the square cutout.

Rack-type shelving systems are used in heavy-duty storage scenarios. These types of shelving systems typically use elongated metal components that are assembled together to give the resultant shelving units their shape and mechanical support, and to position the associated shelves. Typically, these components are assembled at 90° angles that extend relative to each other in various directions, depending on the particular component. Variations of this shelving include components that can be assembled together with fasteners and/or tools. Further, the vertical and horizontal components of these types of shelving are often fabricated from bent sheet material or various extrusions to give the desired strength at a reduced weight and cost compared to solid or cast materials. The vertical and horizontal components can include a number of slots that permit the shelving to be assembled to have shelves of various heights, lengths, widths, and shapes.

For ready-to-assemble rack shelving, it is common for the uprights to be split into multiple parts for packaging, storage, shipping, etc. However, the methods for attaching these multiple uprights together are typically cumbersome and non-ergonomic. For example, using a bolt and nut to attach upright sections together requires tools and added time and, unless the bolts are precisely located, sections of the uprights may not be precisely aligned. Another way of connecting uprights is using rivet/keyhole designs. The crossbeams contain two sets of vertically aligned rivets. One rivet goes in the bottom upright and one in the upper upright. This method typically requires multiple people for assembly, extra time, and a hammer to pound the parts into place. Thus, the need exists for a rack shelving assembly which permits uprights to be easily connected in an appropriate alignment.

SUMMARY OF THE INVENTION

According to one aspect of the present invention, an upright connection for shelving includes a spring clip connection. A first upright has at least one tab, with a cutout, extending from an end of the front upright. A second upright has at least one slot with a spring clip extending past the slot. The upright connection is completed when the tab is inserted into the slot, permitting the spring clip to lock into the cutout.

According to another aspect of the present invention, a shelving system includes a plurality of upright members and a plurality of horizontal members connected to the upright members, supporting one or more shelved. The plurality of upright members includes at least one first upright having at least one tab, with a cutout, extending from an end of the first upright. At least one second upright member having at least one slot with a spring clip extending past the slot. The first and second uprights connecting when the tab is fully inserted into the slot, permitting the spring clip to latch into the cutout.

According to yet another aspect of the invention is a method of forming uprights. A first upright is formed with two sides connected at approximately a 90° angle. The first upright has a tab, with a cutout, that extends from a side of the first upright. A second upright is formed with two sides connected at approximately 90° angles. The second upright has a slot with an opening on each side of the second upright. Spring clips are attached to each slot such that the spring clip will engage the cutout when the tabs from the first upright are inserted fully into the slots of the second upright.

These and other features, advantages, and objects of the present invention will be further understood and appreciated by those skilled in the art upon studying the following specification, claims, and appended drawings.

DETAILED DESCRIPTION OF THE PREFERRED EMBODIMENTS

Figure 1:
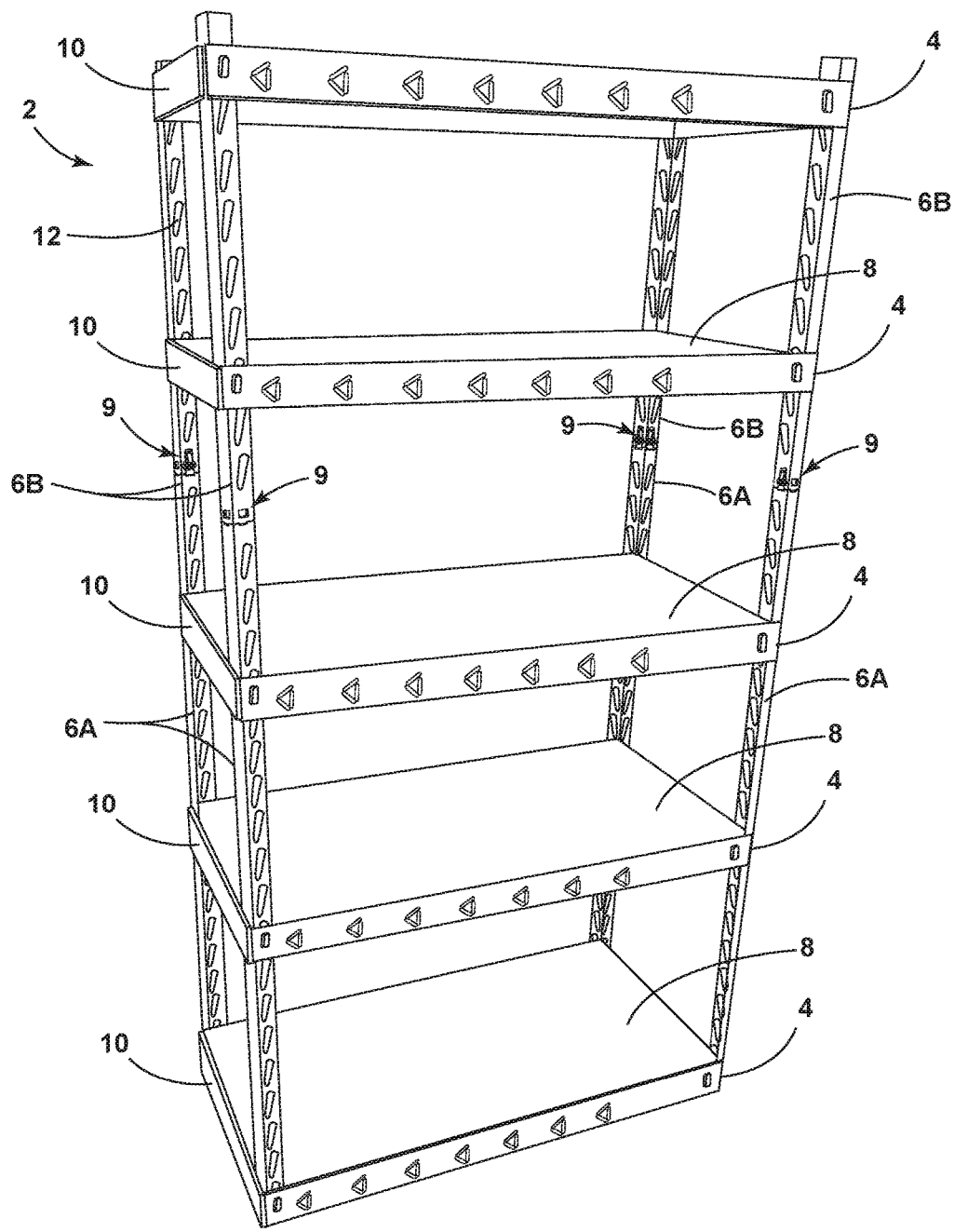
FIG. 1 is a perspective view of a shelving system according to an aspect of the present disclosure.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

Referring to the embodiment illustrated in FIGS. 1-6, reference numeral 2 generally designates a shelving system. The shelving system 2 comprises a plurality of uprights 6A, 6B that are connected using a spring clip connection 9. The shelving assembly 2 also includes a plurality of horizontal shelf support members 4 and optional braces 10 that can support shelves 8. The openings 12 in the uprights 6A, 6B permit positioning of the horizontal shelving support members 4 and optional braces 10 at various heights. In this manner, the number and height of various shelves 8 can be adjusted.

Figure 3:
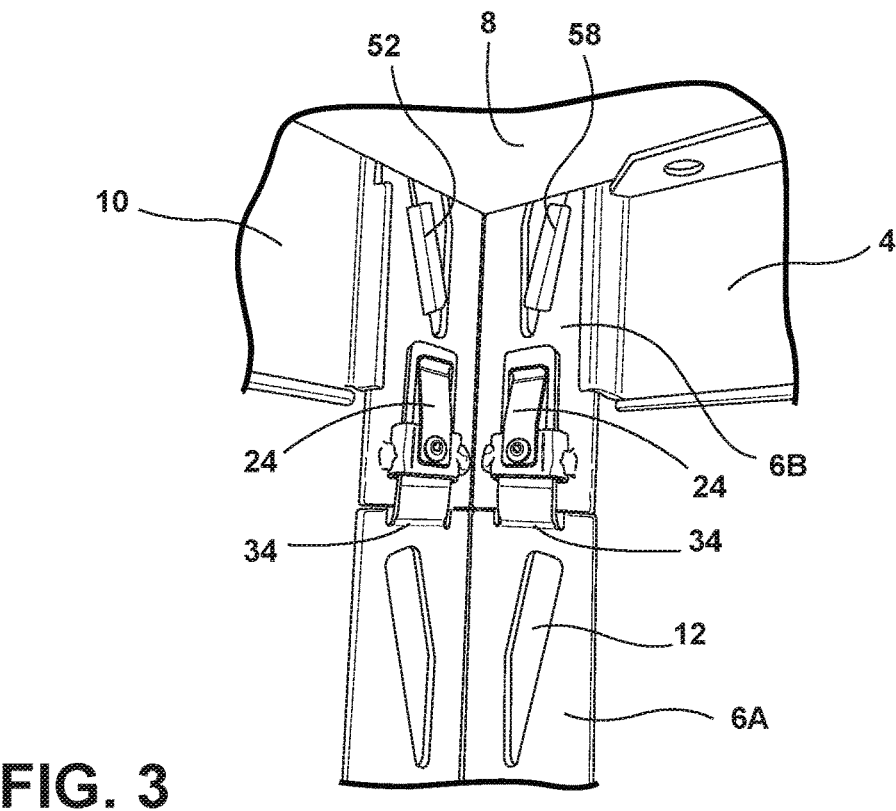
FIG. 3 is a fragmentary perspective view showing the inside corner of a connection of two uprights as part of the shelving system.
Figure 4:
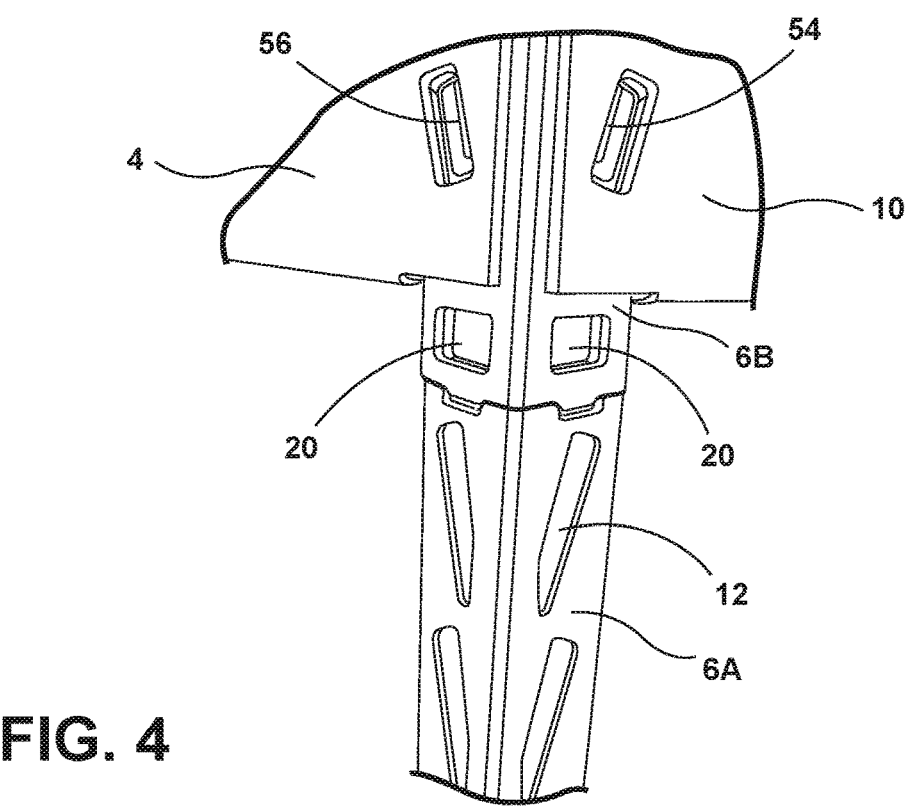
FIG. 4 is a fragmentary perspective view of an outside corner showing the connection of two uprights as part of the shelving system.

As shown in FIGS. 3 and 4, the optional braces 10 and horizontal shelving support members 4 can be connected to the uprights 6A, 6B with connectors 54, 56 that include portions 52, 58 that engage the openings 12 of the uprights 6A, 6B. The shelf 8 can then rest on the horizontal shelving support members 4 and/or the braces 10. Optionally, shelving 8 can also be mechanically connected to the horizontal shelving support member 4 and/or brace 10 by mechanical means, such as by fasteners, rivets, or tabs or by other mechanical coupling.

Figure 2:
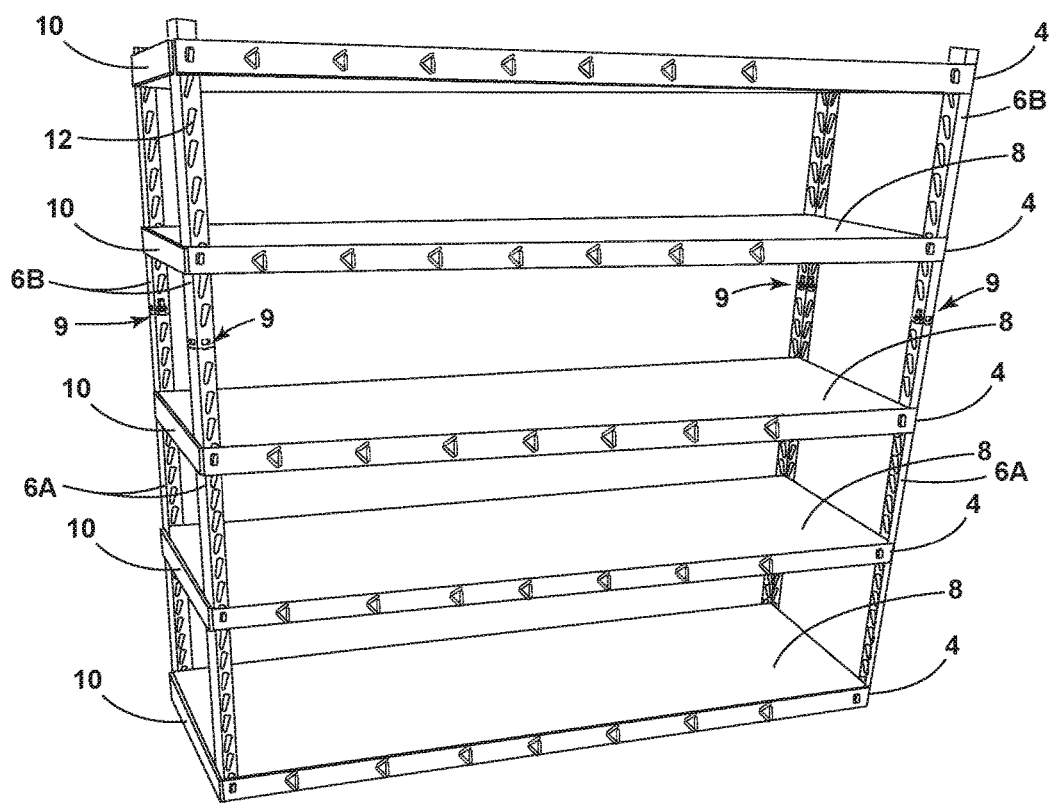
FIG. 2 is a perspective view of a shelving system according to an aspect of the present disclosure.
Figure 5:
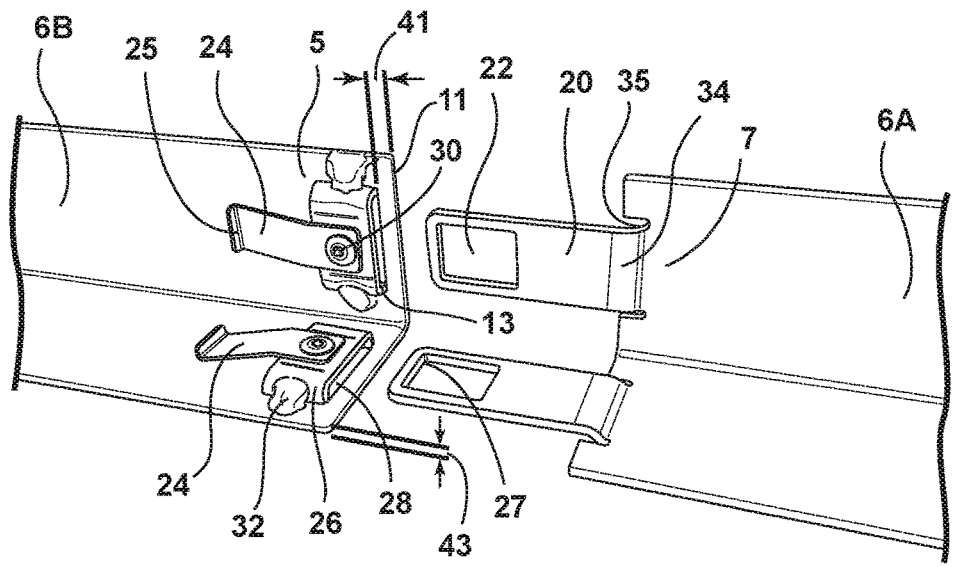
FIG. 5 is a perspective view of the two uprights with the spring clip connection prior to two uprights being connected.
Figure 6:
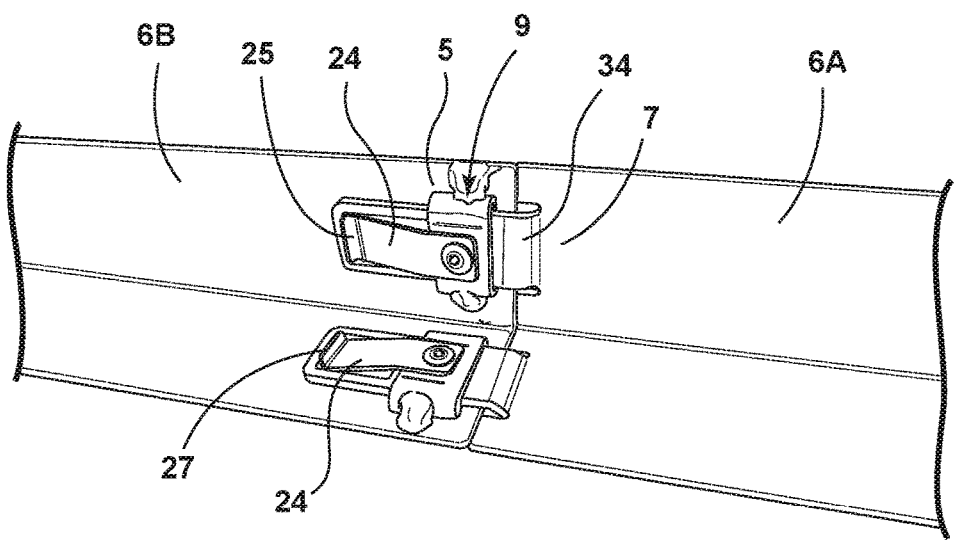
FIG. 6 is a fragmentary perspective view of two connected uprights utilizing the spring clip connection prior to being incorporated into a shelving rack system.

As shown in FIGS. 1 and 2, multiple uprights 6A, 6B can be connected to increase the height of the rack shelving assembly 2. As illustrated in FIGS. 5 and 6, this spring clip connection 9 consists of one upright 6A containing a tab 20 with a cutout 22 that is on the end 7 of an upright member 6A. The tab 20 can have a bend 34 to space the tab 20 in a plane to account for the approximate thickness 43 of the end 5 of upright 6B. The bend 34 also creates a gap 35 that is the approximate size of the width 41 between the terminal end 11 of upright 6B and the beginning 13 of the slot 26. The tab 20 can be formed as part of the forming step used to create the upright 6A. Alternatively, the tab 20 can be formed by a secondary step and/or attached to the upright 6A via a weld or other coupling.

The other upright member 6B has an end 5 that includes at least one formed slot 26 with an opening 28. The slot 26 can be formed as part of the forming process for upright 6B. Alternatively, the slot 26 can be formed in a secondary step and/or attached to the upright 6B via a weld or other coupling. Even if the slot 26 is formed as part of the initial forming process, it can be reinforced by a weld 32 joint or similar coupling. Both of the uprights 6A, 6B will be typically fashioned from a stable structural material, such as a high-strength polymer, or a metal, such as aluminum or steel.

A spring clip 24 extends from the slot 26, as shown in FIGS. 5 and 6. The spring clip 24 can be integrally formed with the slot 26 or can be a separate part that is attached via a fastener 30 (as shown in FIGS. 5 and 6) or otherwise coupled to the slot 26 by a weld, adhesive, or other coupling. The spring clip 24 includes an end 25 that can engage a surface 27 of cutout 22 when the spring clip connection 9 is completed, as shown in FIG. 6. The spring clip 24 can be made from a stable structural material, such as a high-strength polymer, or a metal, such as aluminum or steel.

FIGS. 5 and 6 illustrate the connection of the uprights 6A, 6B. The illustrated upright 6A has two tabs 20 with cutouts 22 prior to being connected to the upright 6B, having two formed slots 26 with openings 28 with spring clips 24. As the tabs 20 are inserted into the slots 26 through opening 28, the upright 6A is aligned and the spring clips 24 open up. When the tabs 20 are fully inserted, the spring clips 24 latch into the cutouts 22 of the tabs 20 of the upright 6A with the end 25 of the spring clip 24 being in the cutout 22 and potentially engaging end 27, as shown in FIG. 6. This latching prevents the uprights 6A, 6B from being removed from each other while the slots 26 and tabs 20 maintain the alignment of the uprights 6A, 6B.

While the cutouts 22 are shown as being square and the end 25 of the spring clip 24 is shown as generally rectangular in shape, the cutouts 22 and end 25 of the spring clip 24 can have different shapes provided that the end 25 of the spring clip 24 can be received and engage cutout 22. In addition, while the illustrated embodiment shows the spring clip connection 9 being used with the uprights 6A, 6B, the spring clip connection 9 could also be used to connect different sections of the horizontal support members 4.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed:

1. An upright connection for shelving, comprising:
   a first upright having at least one tab extending near an end of the first upright:
      wherein said tab has a bend to space said tab in a plane that is generally parallel to said first upright, said tab having a first distance between a start of the bend and said end of said first upright;
      wherein said tab includes a rectangular cutout spaced entirely within the tab;
   a second upright having at least one slot located near an end of the second upright;
      wherein a start of said slot is spaced a second distance from said end of said second upright, said second distance being approximately the same as said first distance between said start of said bend and said end of said first upright;
      wherein a spring clip is attached to said slot and extends away from said end of said second upright;
   wherein the distance between said plane of said tab and said first upright is approximately the same distance as the thickness of said second upright; and
   wherein when said tab is inserted into said slot, said spring clip latches into said cutout thereby connecting and aligning the first and second uprights.

2. The upright connection for shelving of claim 1, wherein the first and second uprights each have two sides that are connected to one another at approximately a 90° angle.

3. The upright connection for shelving of claim 2, wherein said first upright has one of said at least one tab with a cutout on each of said two sides of said first upright.

4. The upright connection for shelving of claim 3, wherein an end of the spring clip has a generally rectangular shape.

5. The upright connection for shelving of claim 4, wherein the spring clip is a metal spring clip welded onto the slot.

6. The upright connection for shelving of claim 1, wherein the spring clip is a metal spring clip connected to the slot via a fastener.

7. A shelving system, comprising:
   a plurality of upright members;
   a plurality of horizontal members, coupled to one or more of the upright members, supporting one or more shelves; and
   wherein the plurality of uprights include at least one first upright member having at least one tab extending near an end of the first upright:
      wherein said tab has a bend to space said tab in a plane that is generally parallel to said first upright said tab having a first distance between a start of the bend and said end of said first upright;
      wherein said tab includes a rectangular cutout spaced entirely within said tab;
   at least one second upright member having at least one slot located near an end of said second upright;
      wherein a start of said slot is spaced a second distance from said end of said second upright, said second distance being approximately the same as said first distance between said start of said bend and said end of said first upright;
      wherein a spring clip is connected to the slot and extends away from said end of the second upright; and
   wherein the distance between said plane of said tab and said first upright is approximately the same distance as the thickness of said second upright; and
   wherein when said tab is inserted into said slot, said spring clip latches into the cutout thereby connecting and aligning the associated first and second uprights to create one of the plurality of upright members.

8. The shelving system of claim 7, wherein each of the first and second upright members has two sides connected at an approximately 90° angle with said cutout of one of said at least one tab on each of the two sides of the first upright member and one of said at least one slot with a spring clip on each of the two sides of the second upright member.

9. The shelving system of claim 8, wherein said cutouts are square shaped.

10. The shelving system of claim 7, wherein the spring clip is a metal spring clip coupled to the slot via a fastener.

11. The shelving system of claim 8, wherein the first and second upright members are formed from metal.

12. The shelving system of claim 11, wherein the tabs are formed with a bend to accommodate the thickness of the two sides of the second upright member.

* * * * *